US012731049B2

(12) United States Patent
Zhao et al.

(10) Patent No.: US 12,731,049 B2
(45) Date of Patent: Sep. 8, 2026

(54) METHODS AND SYSTEMS FOR ANOMALY AND PATTERN DETECTION OF UNSTRUCTURED BIG DATA

(71) Applicant: Intelligent Fusion Technology, Inc., Germantown, MD (US)

(72) Inventors: Qingliang Zhao, Germantown, MD (US); Jiaoyue Liu, Germantown, MD (US); Nichole Sullivan, Germantown, MD (US); Kuochu Chang, Fairfax, VA (US); Erik Blasch, Arlington, VA (US); Genshe Chen, Germantown, MD (US)

(73) Assignee: Intelligent Fusion Technology, Inc., Germantown, MD (US)

( * ) Notice: Subject to any disclaimer, the term of this patent is extended or adjusted under 35 U.S.C. 154(b) by 985 days.

(21) Appl. No.: 17/534,754

(22) Filed: Nov. 24, 2021

(65) Prior Publication Data

US 2023/0186120 A1 Jun. 15, 2023

(51) Int. Cl.

| | |
|---|---|
| ***G06N 5/04*** | (2023.01) |
| ***G06F 16/25*** | (2019.01) |
| ***G06F 16/26*** | (2019.01) |
| ***G06F 40/295*** | (2020.01) |
| ***G06F 40/30*** | (2020.01) |
| ***G06N 5/022*** | (2023.01) |

(52) U.S. Cl.

CPC ............. *G06N 5/04* (2013.01); *G06F 16/258* (2019.01); *G06F 16/26* (2019.01); *G06F 40/295* (2020.01); *G06F 40/30* (2020.01); *G06N 5/022* (2013.01)

(58) Field of Classification Search

None

See application file for complete search history.

(56) References Cited

U.S. PATENT DOCUMENTS

| | | | | |
|---|---|---|---|---|
| 9,984,427 | B2 * | 5/2018 | Dave | G06Q 50/01 |
| 9,990,357 | B2 * | 6/2018 | Myslinski | G06F 16/244 |

(Continued)

OTHER PUBLICATIONS

Enhance d Heartb eat Graph for emerging event detection on Twitter using time series networks; Saeed et al. (Year: 2019).*

(Continued)

*Primary Examiner* — Mandrita Brahmachari

(74) *Attorney, Agent, or Firm* — Anova Law Group, PLLC

(57) ABSTRACT

A computing system includes: a memory, containing instructions for a method for anomaly and pattern detection of unstructured big data via semantic analysis and dynamic knowledge graph construction; a processor, coupled with the memory and, when the instructions being executed, configured to: receive unstructured big data associated with social network interactions, events, or activities; parse and structure the unstructured big data to generate structured big data; form a dynamic knowledge base based on the structured big data; and perform sematic reasoning on the dynamic knowledge base to discover patterns and anomalies among the social network interactions, events, or activities; and a display, comprising an interactive graphical user interface (GUI), configured to receive the anomalies and patterns to display real-time actionable alerts, provide recommendations, and support decisions.

20 Claims, 10 Drawing Sheets

(56) References Cited

U.S. PATENT DOCUMENTS

| | | | | |
|---|---|---|---|---|
| 2013/0073346 | A1* | 3/2013 | Chun | H04L 67/104 705/7.39 |
| 2014/0096249 | A1* | 4/2014 | Dupont | G06F 21/00 726/23 |
| 2015/0220530 | A1* | 8/2015 | Banadaki | G06F 16/90 707/723 |
| 2017/0293666 | A1* | 10/2017 | Ragavan | G06F 16/9024 |
| 2019/0235961 | A1* | 8/2019 | Giovannini | G06F 11/1448 |
| 2019/0324441 | A1* | 10/2019 | Cella | G05B 19/0425 |
| 2019/0392074 | A1* | 12/2019 | Little | G06F 16/288 |
| 2020/0120118 | A1* | 4/2020 | Shu | G06F 21/54 |
| 2021/0182859 | A1* | 6/2021 | Srinivasa Rao | G06Q 20/4016 |
| 2021/0194905 | A1* | 6/2021 | Fong | H04L 63/1425 |
| 2022/0164683 | A1* | 5/2022 | Hao | G06F 16/35 |

OTHER PUBLICATIONS

LinkNBed: Multi-Graph Representation Learning with Entity Linkage Trivedi et al. (Year: 2018).*

Zafar Saeed et al., "Enhanced Heartbeat Graph for emerging event detection on Twitter using time series networks", Expert Systems With Applications, Jun. 11, 2019, 136 (2019) 115-132, Elsevier.

* cited by examiner

200

| | Source Name | CAMEO Code | Target Name |
|---|---|---|---|
| 0 | Government (United States) | 190 | United Nations |
| 1 | Education (Israel) | 10 | Jerusalem Post |
| 2 | Israel | 195 | Iran |
| 3 | Israel | 195 | Syria |
| 4 | Attack Craft (Syria) | 195 | Syria |
| 5 | Israel | 42 | Russia |
| 6 | Russia | 43 | Israel |
| 7 | Israel | 181 | Citizen (Israel) |
| 8 | Benjamin Netanyahu | 43 | Abdel Fattah Al-Sisi |
| 9 | Abdel Fattah Al-Sisi | 43 | Benjamin Netanyahu |
| 10 | Abdel Fattah Al-Sisi | 46 | Benjamin Netanyahu |
| 11 | Benjamin Netanyahu | 46 | Donald Trump |
| 12 | Benjamin Netanyahu | 40 | Abdel Fattah Al-Sisi |
| 13 | Donald Trump | 40 | Benjamin Netanyahu |
| 14 | Sebastian Kurz | 40 | Benjamin Netanyahu |
| 15 | Benjamin Netanyahu | 40 | Sebastian Kurz |
| 16 | Sebastian Kurz | 36 | European Union |
| 17 | Benjamin Netanyahu | 10 | Revolutionary Guards |
| 18 | Meretz | 10 | Benjamin Netanyahu |
| 19 | Mahmoud Abbas | 111 | Donald Trump |
| 20 | Mahmoud Abbas | 10 | Palestinian Territory, Occupied |
| 21 | Mahmoud Abbas | 112 | Donald Trump |
| 22 | Air Force (Israel) | 190 | Syria |
| 23 | Reuven Rivlin | 32 | Lars Lokke Rasmussen |
| 24 | Reuven Rivlin | 36 | Denmark |
| 25 | United States | 231 | Palestinian Territory, Occupied |

FIG. 4A

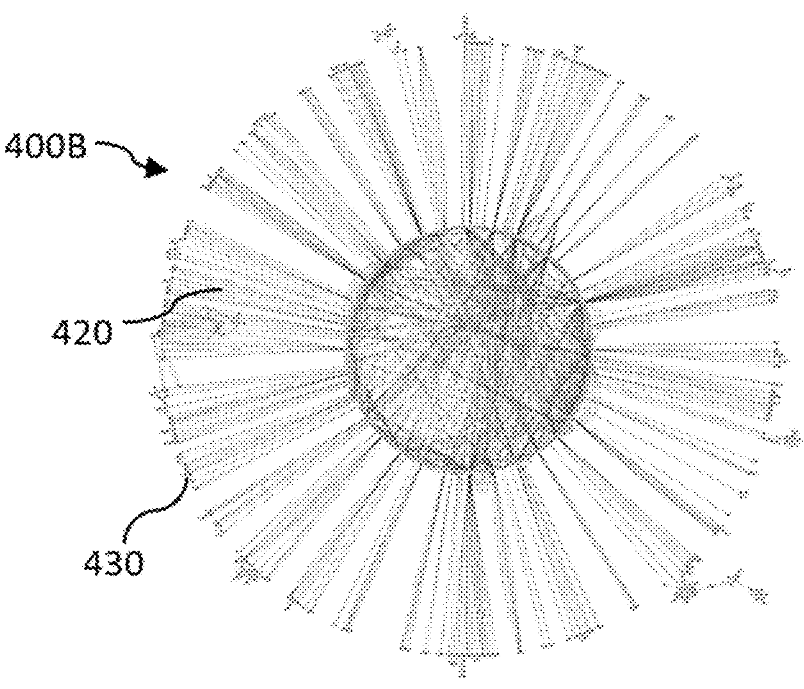

| Methods | AUC |
| --- | --- |
| **Katz** | **0.7844** |
| Adar | 0.7522 |
| Origin | 0.7684 |

600

700

800 im/simi/isis
qanon
s
need
kanchana
combat
@inthematrixxx
extremists
female
iran
ended
state
strategy
rise
new
isis
pyt
dr
brain
islamic

Performing triple extraction from text data of the structured big data

1210

Constructing a text data-based knowledge graph(KG)

1220

Constructing a social knowledge graph(SKG)

1230

METHODS AND SYSTEMS FOR ANOMALY AND PATTERN DETECTION OF UNSTRUCTURED BIG DATA

GOVERNMENT RIGHTS

This invention was made with Government support under Contract No. FA8750-18-C-0163, awarded by the United States Air Force. The U.S. Government has certain rights in this invention.

DESCRIPTION OF THE DISCLOSURE

The present disclosure relates generally to the field of big data technology and, more particularly, relates to computer-implemented methods and computing systems for anomaly and pattern detection of unstructured big data via semantic analysis and dynamic knowledge graph construction.

BACKGROUND

With the proliferation of smart devices, such as personal computers and smart phones, a large volume of unstructured data, colloquial text, and images are available on social networking platforms. The era of big data provides a great opportunity for latent anomaly detection at a large scale and in real time. There is an increasing need for both governments (e.g., first responders) and businesses (e.g., security personnel) to discover latent anomalous activities in unstructured publicly available data produced by professional agencies and the general public, for safety and protection.

Recent efforts have focused on data fusion solutions to alter the labor-intensive collection, exploitation, and dissemination (PED) cycle of analysis and replace it with a data-driven rapid integration and correlation process. However, there is still a significant opportunity to augment the PED cycle with publicly available data (PAD). Particularly, there is a need to develop a proper big data-enabled analytic system with scalable architecture, in order to shorten the critical sensor collection-to-analysis timeline. For many intelligence scenarios, near real-time activity-based analysis of threats and subsequent indication and warnings (I&W) are necessary to allow for appropriate decision/reactions to be initiated. However, real-time data acquisition, and the processing and interpretation of various types of unstructured data, remain a challenge.

Thus, there is a need to overcome these and other problems of the prior art and to provide methods and systems for anomaly detection of unstructured big data via semantic analysis and dynamic knowledge graph construction.

BRIEF SUMMARY OF THE DISCLOSURE

One aspect or embodiment of the present disclosure includes a computing system. The computing system includes: a memory, containing instructions for a method for anomaly and pattern detection of unstructured big data via semantic analysis and dynamic knowledge graph construction; a processor, coupled with the memory and, when the instructions being executed, configured to: receive unstructured big data associated with social network interactions, events, or activities; parse and structure the unstructured big data to generate structured big data; form a dynamic knowledge base based on the structured big data; and perform sematic reasoning on the dynamic knowledge base to discover patterns and anomalies among the social network interactions, events, or activities; and a display, comprising an interactive graphical user interface (GUI), configured to receive the anomalies and patterns to display real-time actionable alerts, provide recommendations, and support decisions.

Another aspect or embodiment of the present disclosure includes a computer-implemented method for anomaly and pattern detection of unstructured big data via semantic analysis and dynamic knowledge graph construction. The method is performed by a hardware processor of a computer system, and may comprise: receiving unstructured big data associated with social network interactions, events, or activities; parsing and structuring the unstructured big data to generate structured big data; forming a dynamic knowledge base based on the structured big data; performing sematic reasoning on the dynamic knowledge base to discover patterns and anomalies among the social network interactions, events, or activities; and feeding the anomalies and patterns into an interactive graphical user interface (GUI), to display real-time actionable alerts, provide recommendations, and support decisions.

Another aspect or embodiment of the present disclosure includes a non-transitory computer readable storage medium storing instructions that, when executed by one or more processors, cause the one or more processors to perform a method for anomaly and pattern detection of unstructured big data via semantic analysis and dynamic knowledge graph construction. The method comprises: receiving unstructured big data associated with social network interactions, events, or activities; parsing and structuring the unstructured big data to generate structured big data; forming a dynamic knowledge base based on the structured big data; performing sematic reasoning on the dynamic knowledge base to discover patterns and anomalies among the social network interactions, events, or activities; and feeding the anomalies and patterns into an interactive graphical user interface (GUI), to display real-time actionable alerts, provide recommendations, and support decisions.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

FIG. 4A depicts a snapshot of test data for fact checking, according to one embodiment of the present disclosure;

FIG. 4B depicts a diagram of connection of entities of the test data for fact checking in FIG. 4A, according to one embodiment of the present disclosure;

FIG. 8 shows an example of a word cloud of a potential emerging topic detected, according to one embodiment of the present disclosure;

DETAILED DESCRIPTION

Figure 1:
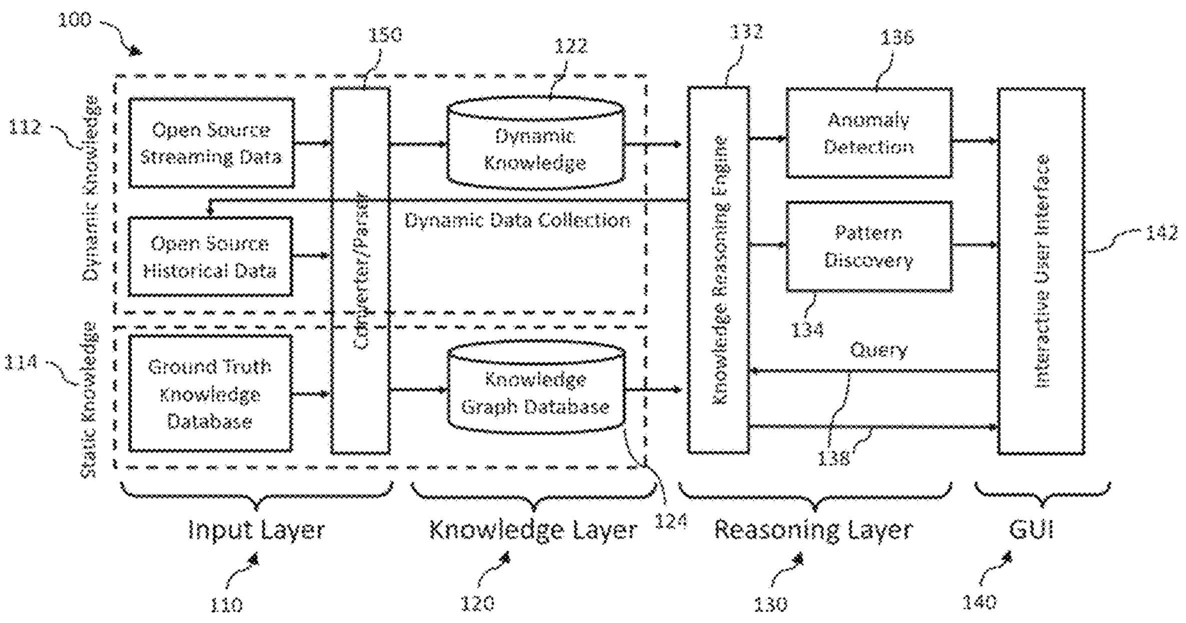
FIG. 1 illustrates an example architecture for Anomaly Detection using Semantic Analysis Knowledge (ADUSAK) System, according to one embodiment of the present disclosure.

Reference will now be made in detail to exemplary embodiments of the disclosure, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the disclosure may be practiced. These embodiments are described in sufficient detail to enable those skilled in the art to practice the disclosure and it is to be understood that other embodiments may be utilized and that changes may be made without departing from the scope of the disclosure. The following description is, therefore, merely exemplary.

As described, there is an increasing need for both governments and businesses to discover latent anomalous activities in unstructured publicly-available data, produced by professional agencies and the general public. Over the past two decades, consumers have begun to use smart devices to both take in and generate a large volume of open-source text-based data, providing the opportunity for latent anomaly analysis. However, real-time data acquisition, and the processing and interpretation of various types of unstructured data, remains a great challenge. Efforts have been focused on artificial intelligence/machine learning (AI/ML) solutions to accelerate the labor-intensive linear collection, exploitation, and dissemination analysis cycle and enhance it with a data-driven rapid integration and correlation process of open-source data. The present disclosure herein provides an Activity Based Intelligence framework for anomaly detection of open-source big data using AI/ML to perform semantic analysis. The disclosed Anomaly Detection using Semantic Analysis Knowledge (ADUSAK) framework may include four layers: input layer, knowledge layer, reasoning layer, and graphical user interface (GUI)/output layer. The corresponding main technologies may include: Information Extraction, Knowledge Graph (KG) construction, Semantic Reasoning, and Pattern Discovery. The present disclosure further verifies the disclosed ADUSAK by performing Emerging Events Detection, Fake News Detection, and Suspicious Network Analysis. The generalized ADUSAK framework can be easily extended to a wide range of applications by adjusting the data collection, modeling construction, and event alerting.

To address the bottlenecks of existing approaches, the Anomaly Detection using Semantic Analysis Knowledge (ADUSAK) can reduce intelligence analysis by constructing a Dynamic Knowledge Graph. The ADUSAK framework performs a data-driven rapid integration and correlation process of large multi-modal data. Comprehensive methodologies are developed to leverage available multi-INT data to extract entities and their correlations to enable pattern discovery and detection of abnormal activities.

The components and corresponding main technologies in ADUSAK can include: Information Extraction, Knowledge Graph (KG) Representation and Inference, Hypothesis Management and Reasoning, Pattern Discovery, and Collections Planning. Additionally, the disclosed ADUSAK can be developed as a user-friendly User Defined Operating Picture (UDOP) web-application prototype. The web-application can receive real-time streaming data and perform Social Network Analysis, Emerging Topic Detection, and/or Fake News Identification. The ADUSAK functioning prototype demonstrates the feasibility to assist analysts and decision makers to provide situation awareness, derive data provenance, and respond to real-time situations.

The architecture of the disclosed ADUSAK and its four layers will next be described. The methodologies and algorithms for dynamic knowledge base construction will be explained in more details. The algorithms used for semantic reasoning will also be presented. The results of anomaly detection examples using real-word data based on the disclosed methods and systems of anomaly detection of unstructured big data via semantic analysis and dynamic knowledge graph construction will be discussed accordingly to verify the methods and systems disclosed herein.

FIG. 1 illustrates an example architecture for Anomaly Detection using Semantic Analysis Knowledge (ADUSAK) System 100, according to one embodiment of the present disclosure. The disclosed methods and systems of anomaly detection of unstructured big data via semantic analysis and dynamic knowledge graph construction are based on the ADUSAK. The ADUSAK framework/system 100 may embody a computing system that comprises a memory, a processor coupled with the memory, and a display coupled to the processor and/or the memory. The ADUSAK framework/system 100 may serve as an alarm and decision support system by producing prioritized recommendations to analysts. The ADUSAK system 100 may be organized in four layers: an input layer 110, a knowledge base layer 120, a reasoning layer 130, and a GUI/output layer 140 as shown in FIG. 1. The input layer 110, the knowledge base layer 120, the reasoning layer 130, and the GUI/output layer 140 may be implemented in computing software (e.g., instructions) and/or computing hardware.

The input layer 110 may be configured to ingest/receive dynamic knowledge 112 from the streaming data (e.g., autonomy in motion) received from publicly available data sources, and to compile static knowledge 114 from historical data (e.g., open source historical data), domain-specific knowledge, ground truth knowledge data, and model-based knowledge (i.e., autonomy at rest). The original data including the dynamic knowledge and the static knowledge may be intelligently parsed and structured via data/information extraction for effective data processing (i.e., autonomy in use), for example by using a converter or parser 150 in FIG. 1.

The knowledge layer 120 may be configured to store static data in a knowledge graph (KG) Database (KGDB) serving as "prior" knowledge and to store dynamic data into knowledge nuggets with the standard resource description framework (RDF) format. As shown in FIG. 1, the static knowledge/data 114 is stored in a knowledge graph database 124, and the dynamic data/knowledge 112 is stored in a dynamic knowledge database 122. Then the knowledge nuggets and "prior" knowledge database may then be fused to form the dynamic knowledge base, which builds the foundation for semantic reasoning.

The reasoning layer 130 may comprise a reasoning engine (e.g., a knowledge reasoning engine 132) that is configured to perform sematic reasoning to discover patterns and anomalies among social network interactions, events, and activities. The knowledge reasoning engine 132 may further be configured to interact with analysts either through manual queries from the output layer 140 or through an automatic anomaly detection module 136 and a pattern discovery module 134. The reasoning results produced by the knowledge reasoning engine 132 can provide feedback to the input layer 110 to enable dynamic data collection, user queries, or subsequent federation data search.

The output layer 140 may comprise a User Defined Operating Picture (UDOP). For example, the detected anomaly and the discovered patterns are fed into an interactive graphical user interface (GUI) 142, to present real-time actionable alerts, provide recommendations, and support decisions.

The input layer 110 and the knowledge layer 120 may be configured to together perform the knowledge base construction. The primary function of the input layer 110 may comprise data collection. The knowledge layer 120 may convert the unstructured data, including text, timestamps and geolocations, into a machine-understandable format, specifically, a knowledge graph for future reasoning.

The data collection by the input layer 110 may comprise dynamic data collection. Dynamic data/knowledge may be obtained from the streaming data of multiple data sources. For example, Online Social Networks (OSNs), such as Facebook™, Twitter™, and Instagram™, are appropriate sources to collect data, due to their large user bases and the various types of information created and shared in virtual communities. As user-generated content, OSNs allow subscribers to share nearly anything in different formats, including text, images, videos, Uniform Resource Locators (URLs), geolocation, etc. Such information may reflect activities, interactions with other users, opinions, and emotions, and may provide a source for latent anomaly discovery. Another dynamic data collection source example is web scraping from websites that contain updated domain knowledge.

The data collection by the input layer 110 may also comprise static data collection. Static data/knowledge may be compiled from publicly available historical data, domain-specific knowledge such as Integrated Conflict Early Warning System (ICEWS) Coded Event data, and large knowledge bases such as YAGO™, Wikidata, and Google™ KG. The static knowledge can be location-specific (such as a country) or situation-specific (political crisis, insurgence activity, social movements, etc.)

The data collection by the input layer 110 may further comprise context data collection. Contextual data/knowledge can be in the form of physical data such as environmental models or knowledge derived from a user as cognitive models. Typically, one goal is for physics-based and human-derived information fusion (PHIF) from which examples include situational awareness from multimodal data of imagery and text of events.

A knowledge graph (KG) may formally represent semantics by describing entities, relationships, and events. A KG allows logical inference for retrieving implicit knowledge rather than only allowing queries requesting explicit knowledge. Subject-Predicate-Object (SPO) triples are widely used as a basic building block of a KG. Event-based knowledge can include geolocation and time, while social KGs may include interactions.

In some embodiments for triple extraction from text data, the first step of a triple extraction may be name entity recognition (NER) for subjects and objects. There are many tools to parse triples, such as CoreNLP, AllenNLP, CasRel, and spaCy. By extracting key entities from each category, the most critical entities can be extracted.

The second step of the triple extraction is predicate recognition. Apart from NER, noise may remain in the extracted results due to the irrelevant information, and the ambiguity of words (i.e., one word may have several meanings, and one meaning can be expressed in different ways). In order to reduce the influence of these conditions, the verb expression may be regulated by using a predicate dictionary that was compiled to map the synonyms to the represented words. Conflict and Mediation Event Observation (CAMEO), a framework for coding event data, can be used as a guideline in creating the predicate dictionary. CAMEO's verb codebook obtains the original words from the definitions of action codes. From the description of each CAMEO action, predicate seeds and complementing seeds are obtained. The predicate seeds are the possible verbs used when the meaning of an action is expressed. While analyzing a sentence, if both the predicate and the complementing expression occur, the corresponding action can be recognized as the summary of the sentence. For each extracted predicate and complementing expression, all of its possible synonyms were queried from WordNet's lexical database and collected to constitute a pool of possible expressions for its corresponding actions. The dictionary of defined actions and possible expressions can help regulate the predicates in triples, which can dramatically reduce the variety of the types of edges in the knowledge graph. As shown in Table 1, the influence of synonyms expression, one verb with multiple meanings, and multiple words collaborative expression is effectively limited.

TABLE 1

Examples of the Dictionary Reducing the variety of Predicates

| Conditions | Raw Predicates (Objects) | CAMEO Code | Regulated Predicates |
|---|---|---|---|
| Synonyms expression | said on says | 10 | Make a statement |
| One verb with multiple meaning | call on hold phone call on | 41 | Discuss by telephone |
| Multiple words collaborative expression | accepts (resignation of Minister of Defense) | 831 | Accede to demands for change in leadership |

Figure 2:
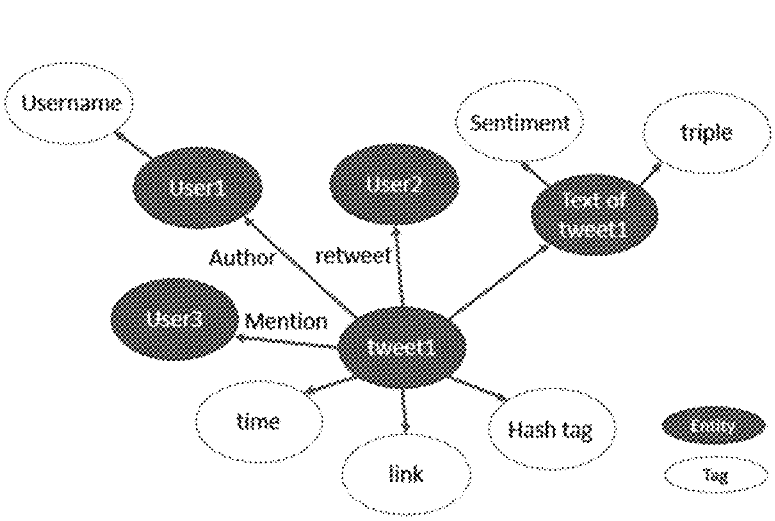
FIG. 2 illustrates a diagram depicting a structure of a social knowledge graph (SKG) of a sample tweet, according to one embodiment of the present disclosure.

In some embodiments, in addition to constructing a KG based on the content of the event-related text data, the ADUSAK disclosed herein may also incorporate a social knowledge graph (SKG) into the KGDB. The SKG can be designed to uncover the relationships of data on social networks such as Twitter™. Tweet data contains many types of information, such as author, hashtag, retweets, mentions, links, and the text itself. To further analyze and mine useful information from a huge expanse of tweet data, the disclosed ADUSAK can include retweets, hashtags, time, and mentions in the SKG structure and builds a SKG to store these multi-dimensional data in a structured way. Each relation may be represented by a triple, namely subject, predicate, and object. For example, the author of Tweet 1, which is User 1, is represented by subject 'tweet 1', predicate 'author', and object 'User1'. A structure 200 of the SKG of a sample tweet is shown in FIG. 2. The tweets SKG can be used for further analysis with techniques such as sequential pattern mining to discover latent (i.e., hidden) behavior and the relationship between users.

In some embodiments, the reasoning layer 130 may comprise semantic analysis and reasoning which may include fact checking. Analysts increasingly rely on publicly available data (PAD) to assess the situation in a "denied area". Unfortunately, PAD sources are flooded with rumors, distorted information, biased reports, and fake news that are unverified or deliberately false. Existing rumor detection models use machine-learning (ML) algorithms to identify content features, user characteristics, and diffusion patterns of posts to capture the dynamic temporal signals of rumor propagation.

From a knowledge-based perspective, one uses a process called fact-checking to detect fake news. The idea is to assess news authenticity by comparing the to-be-verified news content with known facts. It is obvious that the traditional expert-based or crowd-sourced manual fact-checking cannot scale with the volume of newly created data from social media. To address scalability, automatic fact-checking techniques heavily rely on information retrieval (IR) and natural language process (NLP) techniques, as well as on network/graph theory.

In some embodiments, with the extracted facts (i.e., KGDB), an automatic fact-checking process can be divided into: (1) Entity locating: Subject (Object) is matched with a node in the KGDB that represents the same entity as the Subject (Object). In some embodiments, entity resolution techniques may be needed to identify proper matching; (2) Relation verification: Triple (Subject, Predicate, Object) is considered truth if an edge labeled Predicate from the Subject to Object exists in the KGDB. Otherwise, its authenticity may be determined with knowledge inference; (3) Knowledge inference: The probability for the edge labeled Predicate to exist from the Subject to the Object can be computed, e.g., using link prediction methods such as LinkNBed and semantic proximity.

It has been shown that fact checking can be approximated reasonably well by finding the shortest path between entities in a KGDB under properly-defined semantic proximity metrics. A fundamental insight of the ADUSAK approach is the inclusion of information-theoretic considerations in the definition of path length used for fact checking. Specifically, the semantic proximity of a subject (s) and an object (o) in a SPO triple is defined as:

$$W(P_{s,0}) = W(v_1, \ldots, v_n) = \left[1 + \sum_{t=2}^{n-1} \log k(v_t)\right]^{-1} \quad (1)$$

where $v_1$=s, $v_n$=0, $v_2$, . . . , $v_{n-1}$ are the entities in a path between s and o, and k(v) is the degree of entity v, i.e., the number of KG statements in which it participates.

The truth value of a new statement (i.e., SPO triple), e=(s, p, o), $\tau(e) \in [0\ 1]$, can be obtained as from the path $P_{s,o}$:

$$\tau(e) - \max W(P_{s,o}) \quad (2)$$

where if e is already present in the KG (i.e., there is an edge between s and o), it should obviously be assigned the maximum truth. In fact, W=1 when n=2 because there are no other intermediate nodes. Otherwise an indirect path of length n>2 may be found via other nodes. The truth value τ(e) therefore maximizes the semantic proximity defined by Eq. (2), which is equivalent to finding the shortest path between s and o, or the one that provides the maximum information content in the KG.

In some embodiments, besides the sematic proximity, the Adar and Katz measures are also defined to predict links according to the amount of shared links between two nodes. The Adar measurement is defined as the sum of the inverse logarithmic degree centrality of the neighbors shared by the two nodes, namely:

$$W(P_{s,0}) - \sum_{z \in \Gamma(s) \cap \Gamma(o)} \left(\frac{1}{\log|\Gamma(z)|}\right) \quad (3)$$

where Γ(s)∩Γ(o) are the common neighbors of s and o, and |Γ(a)| is the number of neighbors (degree) of z.

The Katz measure is a variant of the shortest-path measure. Katz is based on the topology of the entire network and thus its calculation is more complex than other methods. The Katz measure is defined by considering all paths between two vertices (the subject and the object), namely:

$$W(P_{s,o}) = \sum_{l=1}^{\infty} \beta^l \left|\text{paths}_{s,o}^{(l)}\right| \quad (4)$$

where $$\left|\text{paths}_{s,o}^{(l)}\right|$$

are the number of all the paths of length l from s to o, and β is a small value chosen for dampening.

With the adjacency matrix A of the network (e.g., KG) under consideration, one can verify that the score measure can be obtained by, $$W(P_{s,o}) = \sum_{l=1}^{\infty} \beta^l A^l = (I - \beta A)^{-1} - I \quad (5)$$

where I is the identity matrix and element A(i, j) are variables that take a value 1 if a node i is connected to node j and 0 otherwise. The powers of A indicate the presence (or absence) of links between two nodes through intermediaries. For instance, in matrix $A^3$, if element $A^3(i, j)=1$, it indicates that node i and node j are connected through some path of length 3.

The parameter β, as shown in (5), is the attenuation factor which is used to adjust the weight of path with different lengths. The value of β has to be chosen such that it is smaller than the reciprocal of the absolute value of the largest eigenvalue of the adjacency matrix A. For a large network, when calculating $(1-\beta A)^{-1}$ becomes too expensive, one can choose to approximate the score by truncating the calculation with a maximum path length $l_{max}$, namely:

$$W_t(P_{s,o}) = \sum_{l=1}^{l_{max}} \beta^l A^l \quad (6)$$

The truncated score (6) is a good approximation of the original score (5) when β is very small. In fact, it has been shown that in practice, the truncated score often outperforms the original one for link prediction 0. When an extremely small β is chosen, the longer paths contribute less to the score in comparison to shorter ones so that the results are close to the one with only common neighbors. It has been shown that the Katz measure may outperform most other measures on link prediction and may be practically equivalent to the PageRank system developed by Google™.

Figure 3:
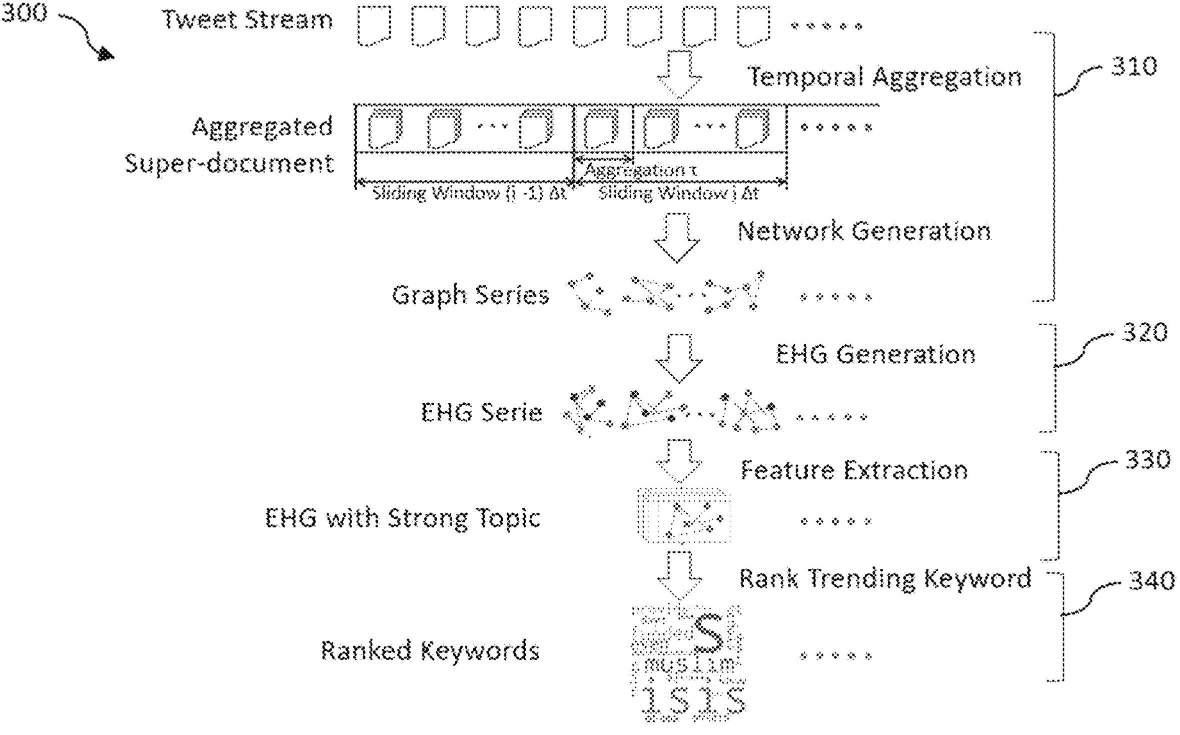
FIG. 3 illustrates an example of an Enhanced Heartbeat Graph based Emerging Event Detection process, according to one embodiment of the present disclosure.

In some embodiments, the reasoning layer 130 may comprise semantic analysis and reasoning which may include emerging event detection. The popularity boom of social media and microblogging services has generated a large amount of data containing significant information about the various events individuals experience in their daily lives. To promptly analyze streaming messages and capture the burstiness of the possible events, the disclosed ADUSAK can apply the Enhanced Heartbeat Graph (EHG) to predict emerging events. FIG. 3 illustrates an example 300 of an Enhanced Heartbeat Graph based Emerging Event Detection process, in accordance with one embodiment of the present disclosure. Event detection methods based on the feature pivot approach focus on statistical modeling of burst features to extract a set of keywords for detecting event-related topics, which helps to capture emerging topics that are previously unseen or rapidly gaining attention in the social stream. As a feature pivot graph-based event detection, EHG suppresses dominating topics in the subsequent data stream after their first detection and attains the topological and temporal relationships in the data by embedding the micro-documents into a graph structure.

As shown in FIG. 3, an Enhanced Heartbeat Graph based emerging event detection may include the following five steps: (1) Word Metrics Series Generation (step 310), which can include temporal aggregation of text stream and network generation of aggregated super-document. As the text stream is collected in real-time, the micro-documents in the text stream is aggregated into super-documents during a fixed-length time period. A set of super-documents is created over time. For each of these super-documents, a set of 2D metrics are created to represent the frequency and the co-occurrence of the words in the super-document; (2) EHG Generation (step 320), EHG series is a set of graphs where each EHG is calculated from a pair of adjacent Metrics in the Word Metrics Series. EHG expresses time-based relative entropy of words and their co-occurrence relations; (3) Feature Extraction and Event Detection (step 330), the burst of possible events is calculated based on the three key features: Divergence Factor, Trend Probability, and Topic Centrality. After extracting the three features, a rule-based classification function is able to identify “Strong” events; (4) Ranking Keywords (step 340), for EHG with label “Strong”, a ranked list of keywords can be obtained by calculating ranking scores for the words within the corresponding super-document of the EHG. The score of each word represents the importance of the word; and (5) Finding the representative micro-document, each micro-document in the period that the Heartbeat Graph labels Strong is assigned a relevance score, and the micro-document with the highest relevance scores is considered the most representative in that time period. The relevance score of a micro-document is calculated as the sum of the ranking score of each word in that corresponding micro-document.

In some embodiments, the reasoning layer 130 may comprise semantic analysis and reasoning which may include Social Network Centrality Analysis. Social network analysis (SNA) provides a clear way to identify the structure of a latent network and plays an important role in reducing criminal activities. The disclosed ADUSAK utilizes ML approaches to map and measure the relationships and data flows between entities, such as people, groups, URLs, etc., in a connected graph. There are a number of applications utilizing the ML analysis in the social networks to explore the interesting features especially with the advancement in information and communication technology.

Social network analysis offers various measures to quantify how influential or important an entity is in an organization. Centrality is a popular way to identify the most significant nodes in a network by analyzing the entities' behaviors and their relation structure. Centrality indices measure the importance of vertexes within a graph using a real-valued function where the resulting values indicate the significance of each node. To evaluate the importance of multiple aspects and identify different types of influencers, the disclosed ADUSAK considers three types of centrality measures on a target network: degree centrality, betweenness centrality, closeness centrality, and eigenvector centrality.

The degree centrality may refer to the number of links connecting to a node. The interpretation of degree depends on the aspects associated with the edges within the network. For example, given a weighted network, the degree has generally the sum of the weights of the edges linking the node. When the graph G=(V, E) is undirected, the degree centrality of vertex v is:

$$G_D(v)=\deg(v) \quad (7)$$

where V is the set of the vertices and E is the set of edges.

For the closeness centrality, in a connected graph, the closeness centrality may refer to the average length of the shortest path from a node to all other nodes which helps to find the ‘broadcasters’ in the network, as defined by Bavelas:

$$C(v) = \frac{1}{\sum_w d(v, w)} \tag{8}$$

where d(v, w) is the distance between vertices v and w.

The betweenness centrality may refer to a measure for quantifying the influence of a person on the communication between people in a social network. It quantifies the number of times a node acts as a bridge along the shortest path between two other nodes. The betweenness centrality of a vertex v in graph G=(V, E) could be represented as:

$$C_B(v) = \sum_{v \neq x \neq y} \frac{\sigma_{xy}(v)}{\sigma_{xy}} \tag{9}$$

where $\sigma_{xy}$ is the shortest path between each pair of nodes (x, y), and $\sigma_{xy}(v)$ is the number of the shortest path of (x, y) passing through the node v.

In an example, a weighted social network graph can be built for a Twitter™ community as follows: each node represents a user and each edge between two users represents a connection, and the edge weight is defined as the frequency of interaction between the two users, such as retweet, mention, or reply. With the social network graph, the Twitter™ users who have the most degree centralities are considered as 'broadcasters', users who have the most closeness centralities are considered as 'connectors', and users who have the most betweenness centralities are considered as 'bridgers/facilitators' in the network.

To evaluate the overall importance of users in the network and take all three kinds of centrality into consideration, the disclosed ADUSAK builds a logistic function to assign a score to each tweeter. Specifically, the network score for Twitter user $v_i$ is defined as:

$$p(v_i) = \frac{1}{1 + \exp(-(\beta_1 C_D(v_i) + \beta_2 C_C(v_i) + \beta_3 C_B(v_i)))} \tag{10}$$

where $\beta_j$, J=[1,2,3] is a parameter to standardize the value of the centralities. The lager the network score is, the more important the user is in a social network.

In some embodiments, the reasoning layer 130 may comprise semantic analysis and reasoning which may include behavior pattern analysis. Among the different types of actions that may be learned, various measures/rules indicate the high probability of sequential correlation or simultaneous appearance of multiple activities. The disclosed ADUSAK regards an association rule between entities' actions as a behavior pattern that provides a way to predict future activities.

Associations rule (AR) mining, proposed by Agrawal, et al., is a rule-based learning method used to discover strong relations between variables in a large dataset. It was originally intended for detecting the rules of product purchasing patterns. An example of such an association rule could be the statement that User1 has a 90% probability to retweet User2 if User2 mentions User1 in that tweet, while this pattern has a 20% chance to happen each day. This statement can be expressed as:

$$\{\text{User2 mention User1}\} \Rightarrow \{\text{User1 retweet User2}\} \quad [\text{sup}=20\%,\text{conf}=90\%] \tag{11}$$

To select the rules of interest from all possible rules, several measures of significance can be applied for assessment: let I be a set of user behaviors, an association rule is an implication of the form X⇒Y, where X⊂I, Y⊂I, let T={$t_1$, $t_2$, $t_3$, . . . , $t_n$} be a set of historical behaviors, each t in T happens within a fixed time interval X∩Y=∅.

Herein "support" is defined as a measure of how popular an item set is in the database:

$$sup(X) = \frac{|t \in T; X \subseteq t|}{|T|} \tag{12}$$

Herein "confidence" is defined to indicate how often a rule is to be found as true:

$$conf(X \Rightarrow Y) = \frac{sup(X \cup Y)}{sup(X)} \tag{13}$$

Herein "lift" is defined as a ratio of the confidence of the rule and the expected confidence of the rule. It measures the performance of a targeting model in predicting cases with an enhanced response:

$$\text{lift}(X \Rightarrow Y) = \frac{conf(X \Rightarrow Y)}{sup(Y)} = \frac{sup(X \cup Y)}{sup(X)sup(Y)} \tag{14}$$

In some embodiments, the disclosed systems and methods may include the Apriori Algorithm for behavior pattern analysis. The Apriori Algorithm may work as follows: (1) with a minimum threshold for support and confidence, focus on finding rules for the items that have higher support (i.e., strong existence) and higher confidence (i.e., significant co-occurrence with other items); (2) extract all the association rule subsets with higher support than the minimum threshold; (3) select all the rules from the subsets with confidence value higher than the minimum threshold; and (4) order the rules by descending order of lift.

Mining association rules from social media raw data can aid in the efficient analysis of sentiments and trends. Both confidence and lift are taken into account when selecting candidate rules for behavior patterns and event prediction. In some embodiments, results using AI/ML techniques may require a common set of metrics, standards, and interfaces to augment user needs.

The following description will provide some anomaly detection application examples that employ the methods and systems for anomaly detection of unstructured big data via semantic analysis and dynamic knowledge graph construction, as disclosed herein.

In one example for fake news detection, the fact-checking method described above is tested by using the knowledge graph built based on ICEWS collected in November 2018. A snapshot 400A of test data is illustrated in FIG. 4A and a diagram 400B of the connection of entities of the test data is shown in FIG. 4B. In FIG. 4B, the gray lines 420 denote the link, entities are denoted by the black box 430. It can be seen that most entities are connected to one another, and that a small portion of the entities are connected to only a few other entities.

To test the performance of different algorithms, first 100 entities are chosen and their relationships are tested. When testing a fact-checker, factual statements between each entity $e_i$ and $e_j$, i, j∈N, are evaluated, where N is the set of the indexes of the nodes in the testing knowledge graph. To validate the test, an assumption is provided that all the information stored in the KG is true, and if a statement shows a relationship between two entities which could not be found in the graph, that statement is considered as displaying false information and further could also be flagged as fake news. For the entity $e_i$ and $e_j$ directly connected, the edge between these two nodes is removed when the semantic proximity of $e_i$ and $e_j$ is calculated as a subject and an object in an SPO triple. Node removal is used to prevent the relationship from being traced easily. For each pair of $e_i$ and $e_j$, only the maximum semantic proximity $W(P_{e_i,e_j})$ is considered as the truth value between them.

Figure 5:
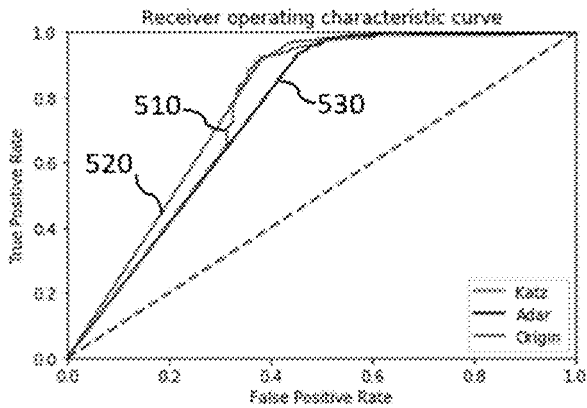
FIG. 5 illustrates a receiver operating characteristic (ROC) curve of different fact checking methods, according to one embodiment of the present disclosure.

A receiver operating characteristic (ROC) curve is used to evaluate the performance of different methods. FIG. 5 illustrates a ROC curve 500 of different fact checking methods, in accordance with one embodiment of the present disclosure. The 'Origin' 510 denotes the maximum semantic proximity method, the Katz 520 denotes the Katz method, and the Adar 530 denotes the Adar method. It can be seen in FIG. 5 that the Katz 520 provides the best performance. Additionally, the area under curve (AUC) 540 of all three methods demonstrates the value of the Katz method.

To demonstrate fact checking methodology with a real-world use case, the disclosed ADUSAK is tested as an end-to-end process to find widely spread tweets that are most likely to be fake within the topic of US-China relations. A ground truth Knowledge Graph from DBpedia is constructed and widely spread tweets concerning US-China relations are collected using Twitter's streaming applications programming interface (API). Tweets that are retweeted the most are parsed into SPO triples and assigned a fact score by fact checking algorithms.

Figure 6:
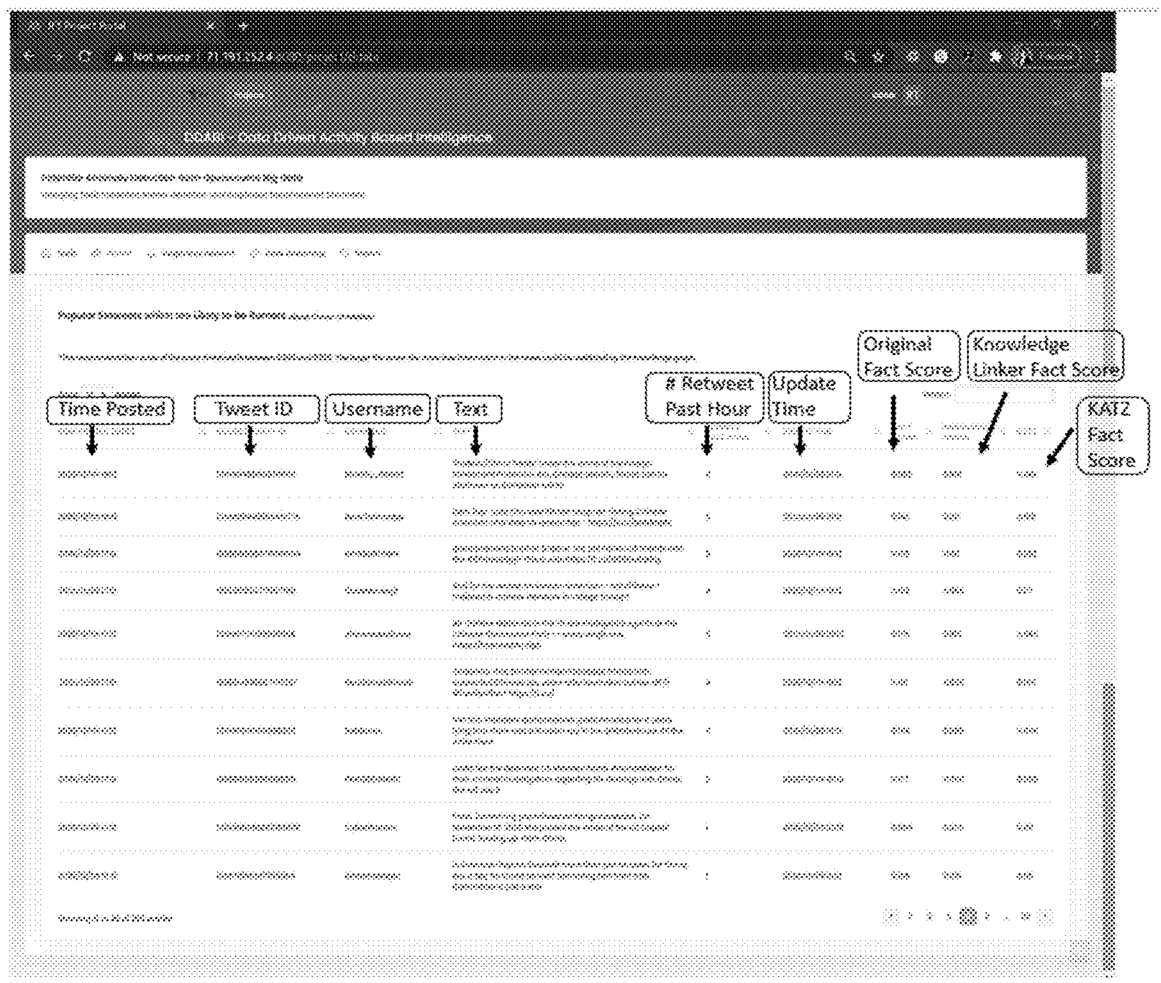
FIG. 6 illustrates an exemplary GUI output of fake news detection according to one embodiment of the present disclosure.

FIG. 6 illustrates an exemplary GUI output 600 of Fake News Detection according to one embodiment of the present disclosure, which displays a list of widely spread tweets that are likely to be false, according to the disclosed ADUSAK fact checking algorithms. Suspicious tweets are updated hourly. The information of each tweet includes a tweet ID, author, timestamp, content, number of retweets in the past hour, and the fact score given by three different algorithms. In general, a tweet with a low fact score indicates a high probability of containing fake news.

An example of emerging events detection will be provided herein. According to the Global Terrorism Database, there were more than 180,000 terrorist attacks worldwide between 1970 and 2017. The terrorist groups with the highest number of attacks are the Taliban, Shining Path, and Islamic State in Iraq and Syria (ISIS). To capture representative potential threats, this example is focused on emerging events detection and social network discovery associated with ISIS-related tweets.

Figure 7:
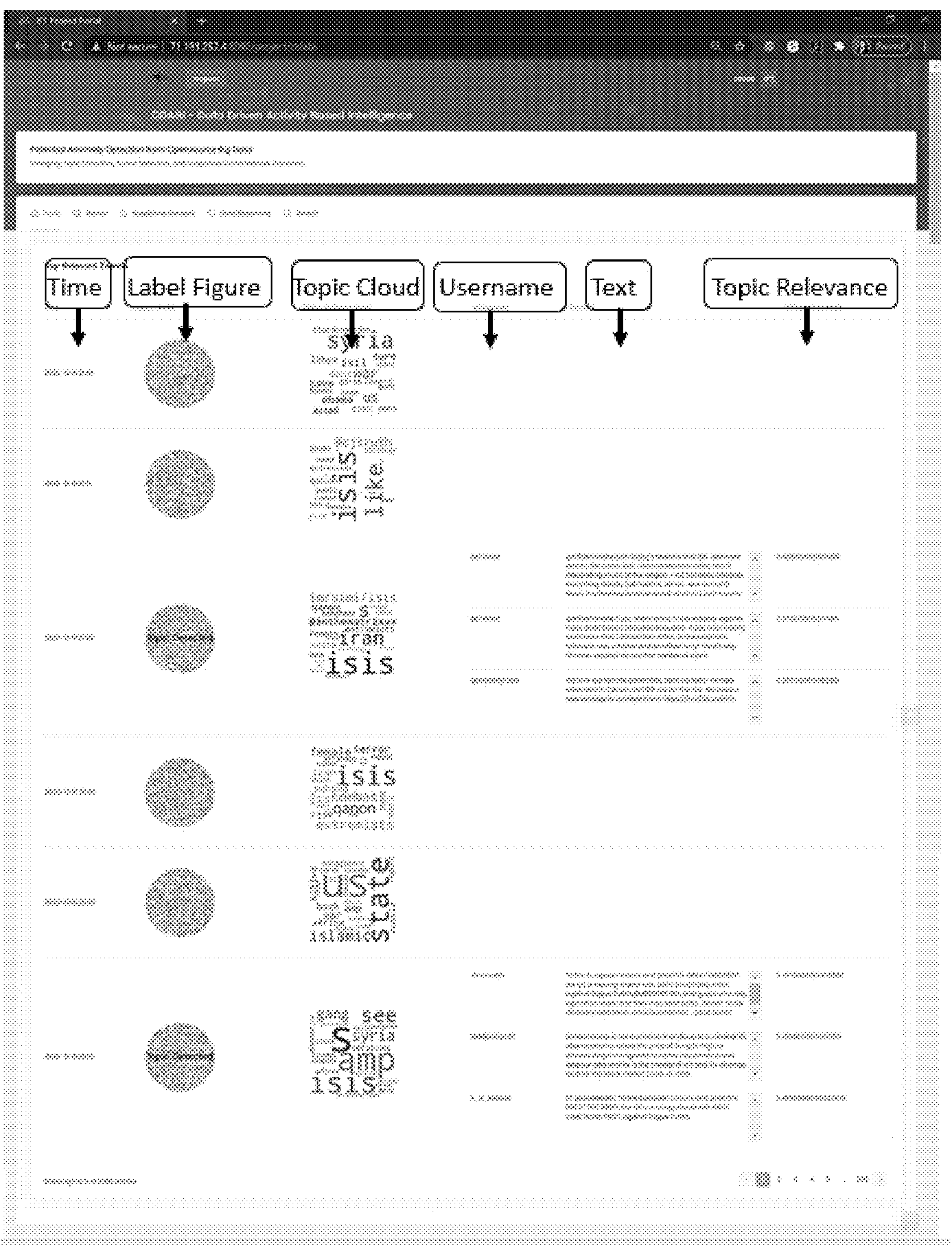
FIG. 7 illustrates an exemplary GUI output of emerging topic detection according to one embodiment of the present disclosure.

To test the feasibility of the Enhanced Heartbeat Graph (EHG) method for real-world emerging topic detection, the algorithm is applied on real-time streaming Twitter data. The tweet stream is collected via Twitter™ streaming API, filtered by ISIS-related keywords (e.g., tweets written in English containing one of the following keywords: "isis", "isil", "daesh", "islamicstate", "raqqa", "Mosul", and "islamic state"). One EHG is calculated every 15 minutes. If an EHD is labeled as strong, a word cloud of ranked topics is generated, and top representative tweets are selected to represent a possible emerging topic. FIG. 7 illustrates an exemplary GUI output 700 of Emerging Topic Detection according to one embodiment of the present disclosure. As shown in FIG. 7, the output of Emerging Topic Detection Tab displays a timeline of emerging topics and sample tweets of each topic, in a sequential order from top to bottom of the strongest topics. Streaming tweets are aggregated and analyzed by the EHG algorithm. A new row of data is generated every 15 minutes, allowing users to keep track of the latest public dynamics.

FIG. 8 shows an example 800 of a word cloud of a potential emerging topic detected at 18:00 (UTC) on Aug. 19, 2020. Table 2 shows the top three representative tweets related to the emerging topic. According to the collected tweets, the detected emerging topic of this time should be related to "The U.S. will not pursue the death penalty against two British ISIS detainees accused of beheading U.S. journalists." The earliest time that this piece of news began appearing on defenseone.com was between 17:00-18:00 (UTC). Many other news websites published this news hours later, as compared to the ADUSAK early detection. This example demonstrates the feasibility of the ADUSAK in real-time emerging topic detection in real-world datasets.

TABLE 2

Top 3 Representative Tweets of Emerging Topic Detected at 18:00 on Aug. 19, 2020

| Tweet Text | Topic relevance |
|---|---|
| SCOOP: AG Bill Barr has sent a letter to the UK formally promising to drop the death penalty for the so-called Beatles accused of beheading US journalists now held in military detention in Iraq if UK turns over needed evidence to charge them in the US. https://t.co/4rWx3Z3GEE | 0.275 |
| The U.S. will not pursue the death penalty against two British ISIS detainees accused of beheading U.S. journalists if the UK agrees to turn over vital evidence in the case, U.S. Attorney General Bill Barr has confirmed in a letter to UK officials. | 0.250 |
| RT @KatieBoWill: SCOOP: AG Bill Barr has sent a letter to the UK formally promising to drop the death penalty for the so-called Beatles a | 0.226 |

An example of suspicious network detection will be provided herein. Based on the ADUSAK methods (i.e. Social Knowledge Graph Construction, Social Network Analysis, and Behavior Pattern Analysis), the dynamic Twitter Social Network graph can be combined with insights from a given static KG dataset. However, to capture events of interest in the ever-changing world, there is a need for a scalable, automated process to discover potentially influential individuals or social networks. Alonso et al. proposed a scalable way to grow the social network by relying on a set of trusted users, which are discovered by two-way communications initiated by verified users. Inspired by trusted users, the disclosed ADUSAK uses a proposed automated social network discovery approach as described below: (1) dynamic social network construction: representative words related to the target social network are selected as keywords. Real-time Twitter™ data filtered by the keywords are collected continuously via Twitter™ Streaming API. Tweets and information of users are analyzed periodically. To narrow down the search scope and reduce computational complexity, only the most active users and those with abnormal behavior are selected and added into a designated database to be further tracked and analyzed; (2) historical social network analysis: the historical behavior of users in the designated database is collected via Twitter API by querying the most recent tweets of each users. These tweets are used to construct a Social Knowledge Graph for social network analysis and pattern analysis. Users with a high centrality score or that have a considerable number of repeated interactions with other existing users in the network are considered influential users.

Figure 9:
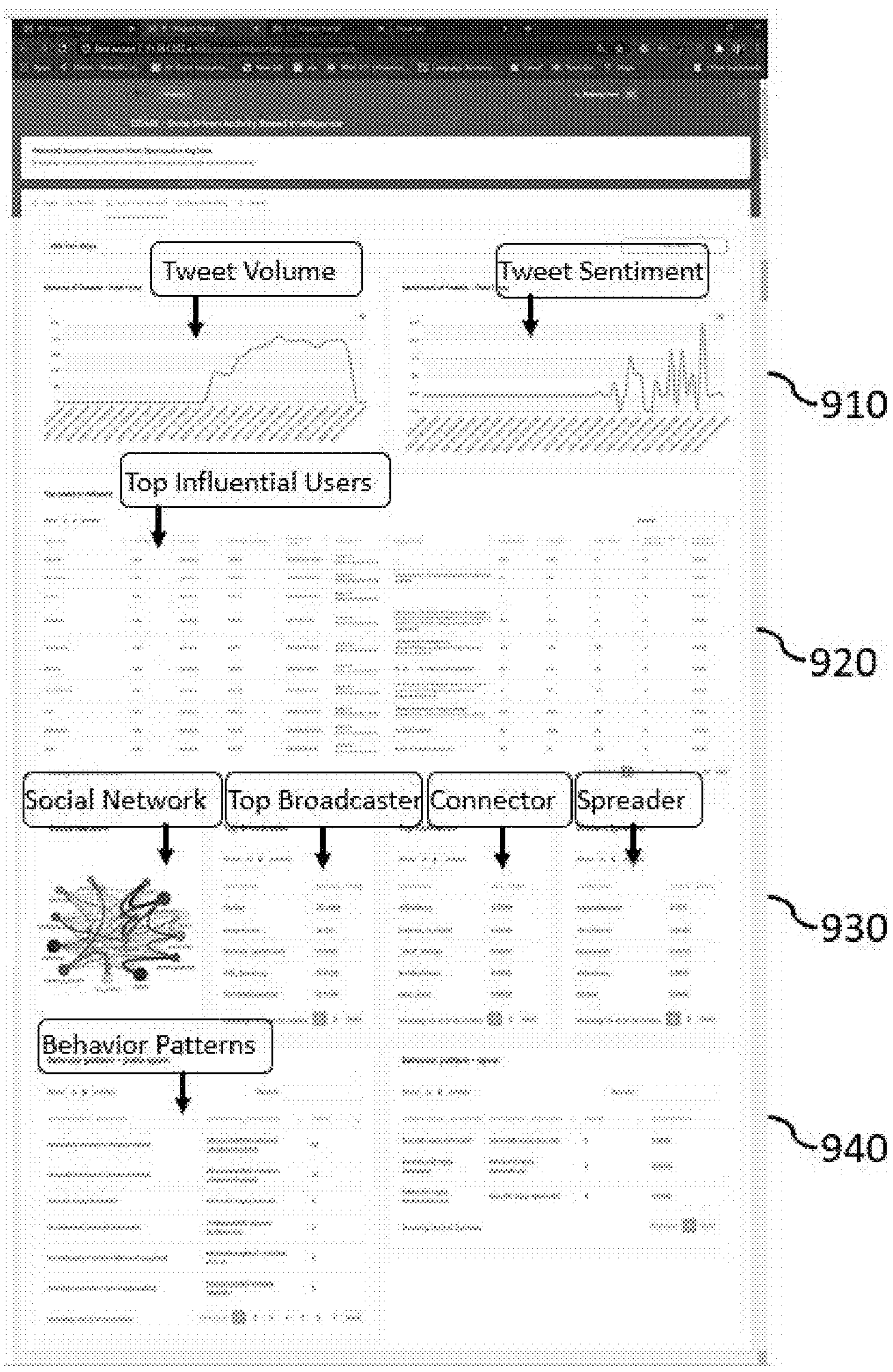
FIG. 9 illustrates an exemplary GUI output of ADUSAK Network Analysis, according to one embodiment of the present disclosure.

FIG. 9 illustrates an exemplary GUI output 900 of social network analysis according to one embodiment of the present disclosure. As shown in FIG. 9, the UDOP GUI social network analysis 900 displays influential Twitter™ users discovered by the ADUSAK system and in related analyses. The display consists of four rows. The time-line charts 910 show volume and sentiment network trends. Under the time-line charts 910 is the Top User Table 920 (keyword table), which displays the most influential users within the network. Below the Top User Table 920 is the Social Network Analysis section 930. A visualized social network graph, top broadcasters, top connecters, and top effective spreaders are displayed in this section. At the bottom is the behavior pattern section 940 displaying the most frequent behavior pairs discovered by pattern mining methods.

As an example, on Jun. 12, 2020, the total number of tweets collected was 60,000. The 1,000 most active users were selected for further analysis. For seven days of historical tweets from these most active users, a total of 309,644 tweets were collected, 310 tweets per user on average.

By counting the number of interactions (retweets/mentions) between users over the seven days, a social network analysis graph was developed. In the social graph, the weight of the node (user) is the total number of interactions of each user, and the weight of each edge is the number of interactions between the two connected users. After calculating the centralities, the network score is assigned based on Equation (1). The larger the network score, the more important the user is in this network. The Top 15 users with the highest scores are shown in Table 3.

TABLE 3

| Top 15 users with highest scores on Jul. 15, 2020 | | | | |
|---|---|---|---|---|
| User name | Degree cent | Bet cent | Close cent | Score |
| Caileen_R_KDKFR | 24.77226 | 0.005853 | 0.061915 | 0.999996 |
| CtrlSec | 24.35376 | 0.004052 | 0.071081 | 0.999975 |
| MosulEye | 25.40649 | 0.00348 | 0.061633 | 0.999949 |
| ultrascanhumint | 12.7439 | 0.003995 | 0.06103 | 0.999664 |
| IraqiSecurity | 13.01798 | 0.003582 | 0.065588 | 0.999568 |
| Halcksandrony | 17.22506 | 0.002986 | 0.05913 | 0.999542 |
| UltrascanMENA | 9.897056 | 0.003214 | 0.066797 | 0.998871 |
| KDKTargets | 20.96223 | 0.001957 | 0.03653 | 0.998555 |
| TRUFCT | 14.16914 | 0.001686 | 0.065874 | 0.997268 |
| Mr_isishunter | 9.703967 | 0.002295 | 0.066968 | 0.996818 |
| aygunyusuf | 8.835481 | 0.002505 | 0.056354 | 0.995775 |
| HussainibnA | 12.28021 | 0.001578 | 0.052896 | 0.993267 |
| tcstops2015 | 8.06299 | 0.002316 | 0.050827 | 0.992794 |
| Zoya_nafidi | 12.96284 | 0.000955 | 0.055217 | 0.989215 |
| bortaqala | 6.746175 | 0.001713 | 0.058904 | 0.986315 |

The top 15 users from Table 3 could be considered influential users that merit special attention. After examining each user manually, it is found that these users can be grouped into one of four categories: (1) Accounts that post suspicious messages that help defend the terrorists, (2) ISIS disseminators, which may be the most suspicious type, (3) Accounts that post news about the Middle East, some of which contain highly sensitive information, and (4) Individuals interested in political topics who may express extreme sentiments.

Figure 10:
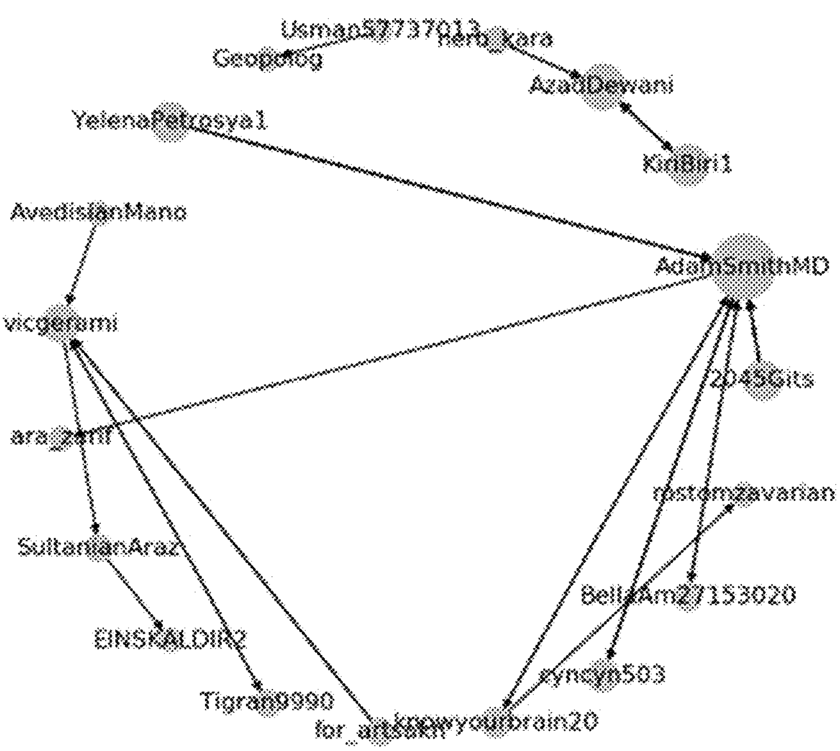
FIG. 10 shows a visualization of a user network extracted from the association rules (the most frequent behavioral connections), according to one embodiment of the present disclosure.

For behavior pattern analysis, drawing from these 24,000+ tweets over the 14 days (168 time frames, 2 hour each) between Oct. 22, 2020 and Nov. 4, 2020, 42 patterns are obtained from Apriori Algorithm (occurrence ≥2, confidence ≥0.5, Lift ≥3). Table 4 shows top 5 occurrence patterns and FIG. 10 shows a diagram 1000 of the visualization of the user network extracted from the association rules. Each of these connections represents a relation between a pair of users, resulting in several interaction networks. The two main networks are: "p26732307, Zoya_nafidi, PrinceP87624788" and "truth3rch3ri, KDKTargets, Caileen_R_KDKFR, zoom3567".

TABLE 4

| Top 5 Occurrence Association Rules | | | | |
|---|---|---|---|---|
| Independent Behavior | Independent Behavior | Occurrence | Confidence | Lift |
| 2045Gits quote AdamSmithMD | AdamSmithMD mention SecPompeo | 5 | 0.833333333 | 8.75 |
| nero_kara retweet AzadDewani | AzadDewani mention EmmanuelMacron | 3 | 1 | 9.882352941 |
| KiriBiril mention AzadDewani | AzadDewani mention EmmanuelMacron | 3 | 0.75 | 7.411764706 |
| KiriBiril quote AzadDewani | AzadDewani mention EmmanuelMacron | 3 | 0.75 | 7.411764706 |
| Usman57737013 retweet Geopolog | Geopolog retweet LucasADWebber | 3 | 0.5 | 3.230769231 |

Overall, the outcome of the automated social network discovery based on the tweet data successfully identified the most influential users related to the topic of ISIS. With the same framework, changing keywords can allow analytics on different topics/social networks.

As described above, publicly available multimodal big data is a great source for pattern discovery, but they are difficult to analyze thoroughly with human labor to determine trends and anomaly detections. To effectively gain in-depth insights in real-time, an automatic machine-learning (ML) based information fusion system is developed. A working prototype, the Anomaly Detection using Semantic Analysis Knowledge (ADUSAK) system and method are disclosed in the present disclosure, which ingest real-time streaming data to perform knowledge analysis. The system and method processes unstructured text into triples from curated models, dynamic information, and streaming data via the streaming process. The ADUSAK system may comprise a knowledge layer to combine static and dynamic knowledge into a structured graph format including an event graph and social graph, and a reasoning layer comprising of multiple ML models to perform automatic anomaly detection and pattern discovery. The ADUSAK system and method are validated for Emerging Events Detection, Fake News Detection, and Suspicious Network Detection. The multi-INT ADUSAK system can be a decision support system providing prioritized recommendations to the analysts that can be easily extended to a wide range of multimodal applications.

Figures 11, 12:
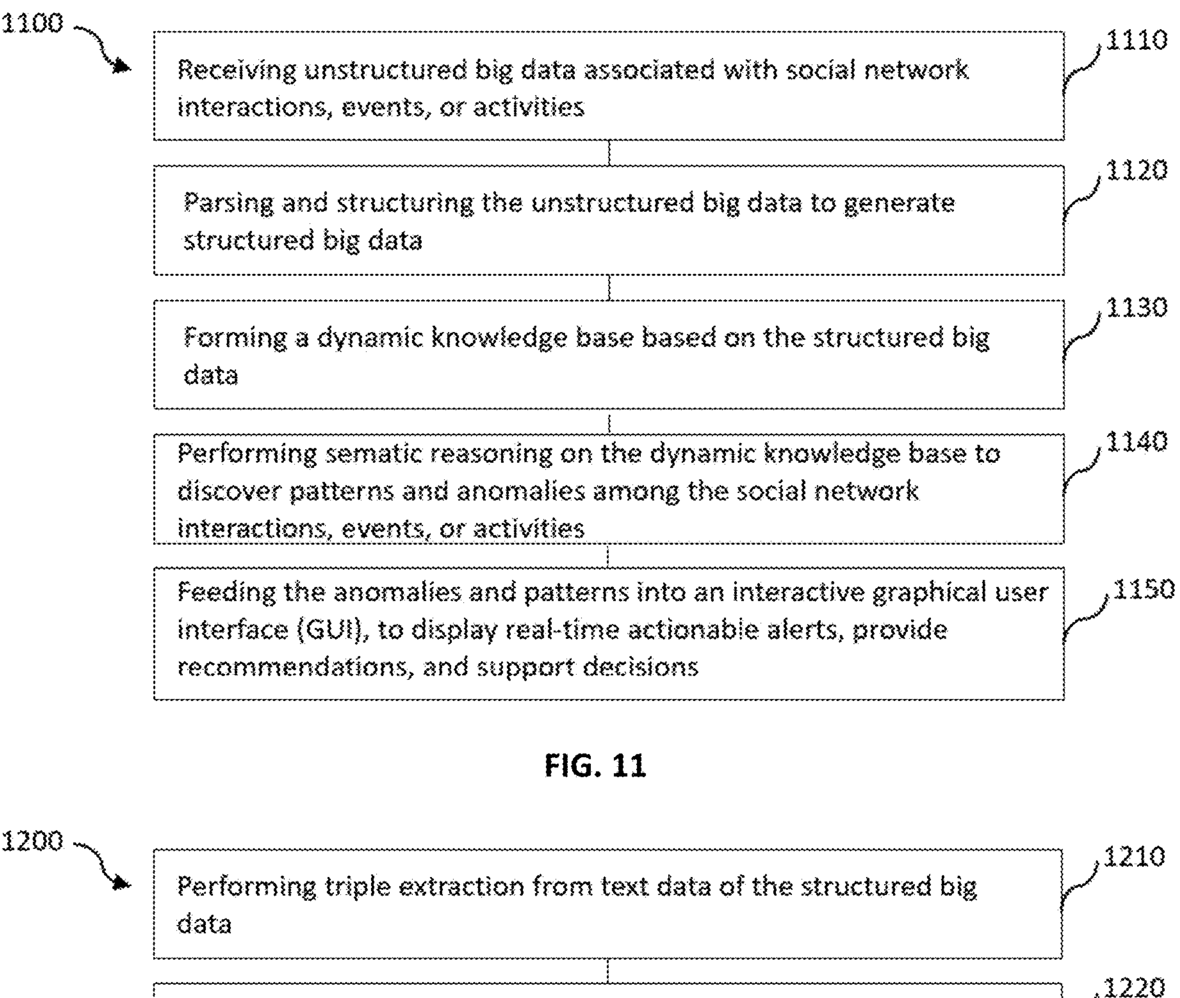
FIG. 11 shows an example computer-implemented method of anomaly and pattern detection of unstructured big data via semantic analysis and dynamic knowledge graph construction, according to one embodiment of the present disclosure.
FIG. 12 shows another example computer-implemented method of anomaly and pattern detection of unstructured big data via semantic analysis and dynamic knowledge graph construction, according to one embodiment of the present disclosure.

FIG. 11 shows an example computer-implemented method 1100 of anomaly and pattern detection of unstructured big data via semantic analysis and dynamic knowledge graph construction, according to an embodiment of the disclosure. As used herein, the semantic analysis may also be referred to as semantic analysis and reasoning, and the dynamic knowledge graph construction may also be referred to as dynamic knowledge base construction. The example method 1100 may be implemented in the example architecture for Anomaly Detection using Semantic Analysis Knowledge (ADUSAK) System 100 (which embodies a computing system). The example method 1100 may be performed/executed by a hardware processor of a computer system. The example method 1100 may comprise, but not limited to, the following steps. The following steps of the method 1100 may be performed sequentially, in parallel, independently, separately, in any order, or in any combination thereof. Further, in some embodiments, one or more of the following steps of the method 1100 may be omitted, and/or modified. In some embodiments, one or more additional steps may be added o included in the method 1100.

In step 1110, an input layer receives unstructured big data associated with social network interactions, events, or activities. The input layer can be, for example, the input layer 110 in FIG. 1. The input layer may comprise one or more application programming interfaces (APIs) for receiving/acquiring the unstructured big data. The unstructured big data may comprise dynamic knowledge and static knowledge. The dynamic knowledge may comprise open source streaming data and open source historical data. The static data may comprise ground truth knowledge data.

The dynamic knowledge may be obtained from the streaming data of multiple data sources (open source streaming data). The multiple data sources may comprise Online Social Networks (OSNs), such as Facebook™, Twitter™, and Instagram™, which are appropriate sources to collect data, due to their large user bases and the various types of information created and shared in virtual communities. The streaming data may be in different formats, including text, images, videos, Uniform Resource Locators (URLs), geolocation, timestamp, etc. Such information may reflect activities, interactions with other users, opinions, and emotions and provide a source for latent anomaly discovery. Another dynamic knowledge data collection source example is web scraping from websites that contain updated domain knowledge.

The static knowledge/data may be compiled from publicly available historical data, domain-specific knowledge such as Integrated Conflict Early Warning System (ICEWS) Coded Event data, and large knowledge bases such as YAGO, Wikidata, and Google KG. The knowledge can be location-specific (such as a country) or situation-specific (political crisis, insurgence activity, social movements, etc.

The unstructured big data may also comprise contextual knowledge/data that can be in the form of physical data such as environmental models or knowledge derived from a user as cognitive models.

The Input layer may be configured to ingest the dynamic knowledge from the streaming data (e.g., autonomy in motion) received from publicly available data sources and to compile static knowledge from historical data, domain-specific knowledge, and model-based knowledge (i.e., autonomy at rest).

In step 1120, the unstructured big data may be parsed and structured, by a parser, to generate structured big data. The unstructured data may be intelligently parsed and structured via data/information extraction for effective data processing (i.e., autonomy in use).

In step 1130, a knowledge layer forms a dynamic knowledge base based on the structured big data. The knowledge layer can be, for example, the knowledge layer 120 in FIG. 1. The knowledge layer may store the static data in a KG Database (KGDB) serving as "prior" knowledge and store the dynamic data into knowledge nuggets with the standard resource description framework (RDF) format. The knowledge layer may be configured to fuse the knowledge nuggets and "prior" knowledge database to form the dynamic knowledge base, which builds the foundation for semantic reasoning.

In step 1140, a reasoning engine performs sematic reasoning on the dynamic knowledge base to discover patterns and anomalies among the social network interactions, events, or activities. The reasoning engine can be, for example, the reasoning engine 132 of the reasoning layer 130 in FIG. 1. The reasoning engine is configured to perform sematic reasoning/analysis to discover the patterns and anomalies among the social network interactions, events, and activities. The reasoning engine may interact with analysts either through manual query from an output layer or through the automatic anomaly detection and pattern discovery module. For example, the reasoning engine can interact with the analysts through the manual query 138 from the interactive user interface 142 in FIG. 1. The reasoning engine can interact with the analysts through the automatic anomaly detection model 136 and the pattern discovery module 134 in FIG. 1. The reasoning results generated by the reasoning engine can provide feedback to the input layer to enable dynamic data collection, user queries, or subsequent federation data search.

In step 1150, the detected/discovered anomalies and patterns may be fed into an interactive graphical user interface (GUI), to present real-time actionable alerts, provide recommendations, and support decisions. The interactive GUI can be, for example, the interactive user interface 142 in FIG. 1.

FIG. 12 shows an example computer-implemented method 1200 of anomaly and pattern detection of unstructured big data via semantic analysis and dynamic knowledge graph construction, according to one embodiment of the present disclosure. The example method 1200 may be implemented in the example architecture for Anomaly Detection using Semantic Analysis Knowledge (ADUSAK) System 100 and can be incorporated in the example method 1100. For example, the example method 1200 may be executed in step 1130 of the example method 1100. That is, forming by a knowledge layer a dynamic knowledge base based on the structured big data may comprise the example method 1200. The following steps of the method 1200 may be performed sequentially, in parallel, independently, separately, in any order, or in any combination thereof. Further, in some embodiments, one or more of the following steps of the method 1200 may be omitted, and/or modified. In some embodiments, one or more additional steps may be added o included in the method 1200.

Forming the dynamic knowledge base may include constructing a knowledge graph (KG) that formally represents semantics by describing entities, relationships, and events. Subject-Predicate-Object (SPO) triples are widely used as a basic building block of a KG. Event-based knowledge may include geolocation and time, while social KGs may include interactions. The example method 1200 may comprise, but not limited to, the following steps.

In step 1210, triple extraction is performed from text data of the structured big data. The triple extraction may include name entity recognition (NER) for subjects and objects, which can be conducted by tools such as CoreNLP, AllenNLP, CasRel, and spaCy. By extracting key entities from each category, the most critical entities are extracted. The triple extraction may further include predicate recognition.

In step 1220, a text data-based knowledge graph (KG) is constructed based on the triple extraction.

In step 1230, a social knowledge graph (SKG) is constructed. In addition to constructing a KG based on the content of the event-related text data (i.e., the text data-based KG), the dynamic knowledge base also includes the SKG that is designed to uncover the relationships of data on social networks. The method 1200 constructs the SKG to store multi-dimensional data in a structured way. Each relation is represented by a triple, namely subject, predicate, and object. The SKG can be used for further analysis with techniques such as sequential pattern mining to discover latent (i.e., hidden) behavior and the relationship between users.

Figure 13:
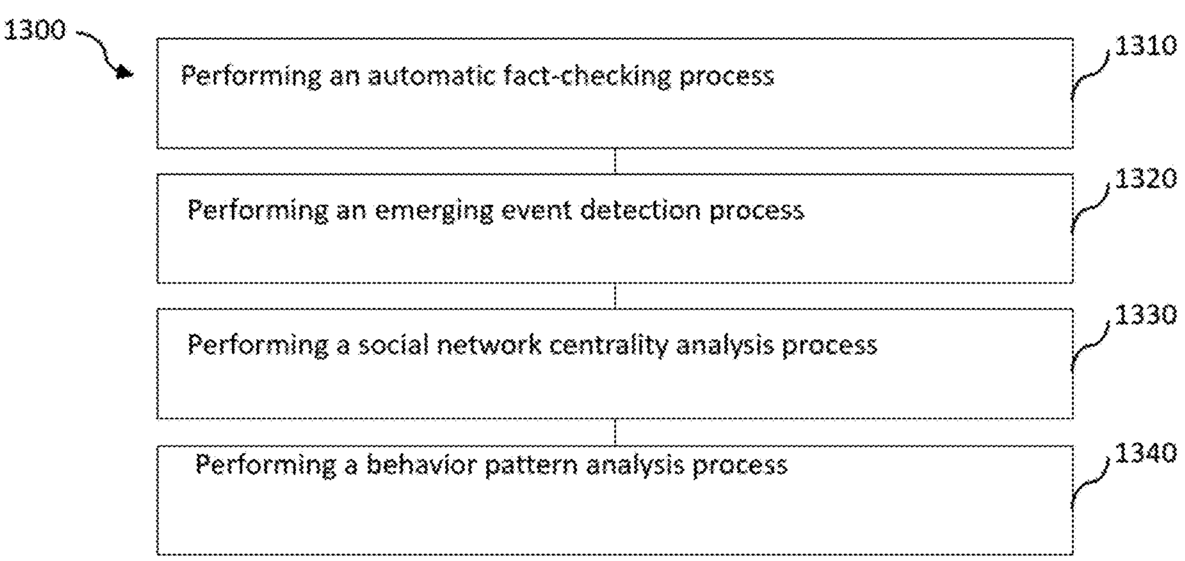
FIG. 13 shows another example computer-implemented method of anomaly and pattern detection of unstructured big data via semantic analysis and dynamic knowledge graph construction, according to one embodiment of the present disclosure.

FIG. 13 shows an example computer-implemented method 1300 of anomaly and pattern detection of unstructured big data via semantic analysis and dynamic knowledge graph construction, according to one embodiment of the present disclosure. The example method 1300 may be implemented in the example architecture for Anomaly Detection using Semantic Analysis Knowledge (ADUSAK) System 100 and can be incorporated in the example method 1100. For example, the example method 1300 may be executed in step 1140 of the example method 1100. That is, the step 1140 of performing, by a reasoning engine, sematic reasoning on the dynamic knowledge base to discover patterns and anomalies among the social network interactions, events, or activities, may comprise the example method 1300. The method 1300 may comprise, but is not limited to the following steps. The following steps of the method 1300 may be performed sequentially, in parallel, independently, separately, in any order, or in any combination thereof. Further, in some embodiments, one or more of the following steps of the method 1300 may be omitted, and/or modified. In some embodiments, one or more additional steps may be added o included in the method 1300.

In 1310, an automatic fact-checking process may be performed by the reasoning engine. The automatic fact-checking techniques may rely on information retrieval (IR) and natural language process (NLP) techniques, as well as on network/graph theory.

With the extracted facts in the dynamic knowledge base, the automatic fact-checking process may include locating entity. For example, Subject (Object) is matched with a node in the dynamic knowledge base that represents the same entity as the Subject (Object). The automatic fact-checking process may also include verifying relation. For example, triple (Subject, Predicate, Object) is considered truth if an edge labeled Predicate from the Subject to Object exists in the dynamic knowledge base. The automatic fact-checking process may also knowledge inference. For example, the probability for the edge labeled Predicate to exist from the Subject to the Object can be computed, e.g., using link prediction methods such as LinkNBed and semantic proximity. In some embodiments, the link prediction methods may comprise Adar and Katz measures.

In step 1320, an emerging event detection process may be performed by the reasoning engine. The emerging event detection process may include a feature pivot graph-based event detection method, such as an Enhanced Heartbeat Graph (EHG). An EHG based emerging event detection method may include the following five steps: Word Metrics Series Generation, EHG Generation, Feature Extraction and Event Detection, Ranking Keywords, and Finding the representative micro-document.

In step 1330, a social network centrality analysis process may be performed by the reasoning engine. Centrality is a way to identify the most significant nodes in a network by analyzing the entities' behaviors and their relation structure. Centrality indices measure the importance of vertexes within a graph using a real-valued function where the resulting values indicate the significance of each node. To evaluate the importance of multiple aspects and identify different types of influencers, the step 1330 may considers three types of centrality measures on a target network: degree centrality, betweenness centrality, and closeness centrality.

In step 1340, a behavior pattern analysis process may be performed by the reasoning engine. The method 1300 regards an association rule between entities' actions as a behavior pattern that provides a way to predict future activities. Associations rule (AR) mining is a rule-based learning method used to discover strong relations between variables in a large dataset. An example AR mining method may include (1) with a minimum threshold for support and confidence, finding rules for the items that have higher support (i.e., strong existence) and higher confidence (i.e., significant co-occurrence with other items); (2) extracting all the association rule subsets with higher support than the minimum threshold; (3) selecting all the rules from the subsets with confidence value higher than the minimum threshold; and (4) ordering the rules by descending order of lift.

Figure 14:
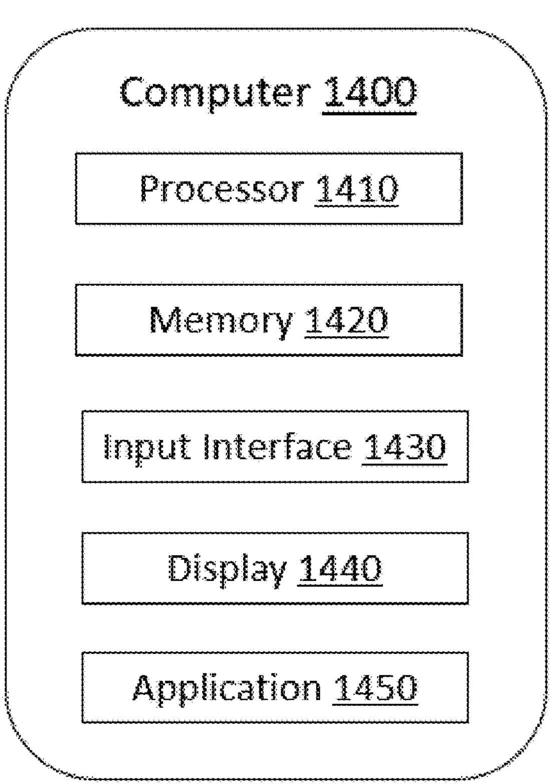
FIG. 14 illustrates an example computer system according to one embodiment of the present disclosure.

FIG. 14 illustrates an example computer system 1400 according to the present disclosure. The computer system 1400 may be used in the systems disclosed herein for performing the methods disclosed herein. The computer system 1400 may include, but not limited to, a desktop computer, a laptop computer, a notebook computer, a smart phone, a tablet computer, a mainframe computer, a server computer, a personal assistant computer, and/or any suitable network-enabled computing device. The computer system 1400 may comprise a processor 1410, a memory 1420 coupled with the processor 1410, an input interface 1430, a display 1440 coupled to the processor 1410 and/or the memory 1420, and an application 1450.

The processor 1410 may include one or more central processing cores, processing circuitry, built-in memories, data and command encoders, additional microprocessors, and security hardware. The processor 1410 may be configured to execute computer program instructions (e.g., the application 1450) to perform various processes and methods disclosed herein.

The memory 1420 may include random access memory, read only memory, programmable read only memory, read/write memory, and flash memory. The memory 1420 may also include magnetic disks, optical disks, floppy disks, hard disks, and any suitable non-transitory computer readable storage medium. The memory 1420 may be configured to access and store data and information and computer program instructions, such as the application 1450, an operating system, a web browser application, and so forth. For example, the memory 1420 may contain instructions for a method for anomaly and pattern detection of unstructured big data via semantic analysis and dynamic knowledge graph construction.

The input interface 1430 may include graphic input interfaces and any device for entering information into the computer system 1400, such as keyboards, mouses, microphones, digital cameras, video recorders, and the like.

The display 1440 may include a computer monitor, a flat panel display, a liquid crystal display, a plasma panel, and any type of device for presenting information to users. For example, the display 1440 may comprise the interactive graphical user interface (GUI) 142, to display real-time actionable alerts, provide recommendations, and support decisions.

The application 1450 may include one or more applications comprising instructions executable by the processor 1410, such as the methods disclosed herein. The application 1450, when executed by the processor 1410, may enable network communications among components/layers of the systems disclosed herein. Upon execution by the processor 1410, the application 1450 may perform the steps and functions described in this disclosure.

The present disclosure further provides a non-transitory computer readable storage medium storing instructions that, when executed by one or more processors of one or more computers, cause the one or more processors to perform a method for anomaly and pattern detection of unstructured big data via semantic analysis and dynamic knowledge graph construction. The method comprises: receiving unstructured big data associated with social network interactions, events, or activities; parsing and structuring the unstructured big data to generate structured big data; forming a dynamic knowledge base based on the structured big data; performing sematic reasoning on the dynamic knowledge base to discover patterns and anomalies among the social network interactions, events, or activities; and feeding the anomalies and patterns into an interactive graphical user interface (GUI), to display real-time actionable alerts, provide recommendations, and support decisions.

While the disclosure has been illustrated with respect to one or more implementations, alterations and/or modifications can be made to the illustrated examples without departing from the spirit and scope of the appended claims. In addition, while a particular feature of the disclosure may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A computing system, comprising:

a memory, containing instructions for a method for anomaly and pattern detection of unstructured big data via semantic analysis and dynamic knowledge graph construction; and a processor, coupled with the memory and, when the instructions being executed, configured to:

receive unstructured big data associated with social network interactions, events, or activities;

parse and structure the unstructured big data to generate structured big data;

form a dynamic knowledge base based on the structured big data; and perform semantic reasoning on the dynamic knowledge base to discover patterns and anomalies among the social network interactions, events, or activities; and a display, comprising an interactive graphical user interface (GUI), configured to receive the anomalies and patterns to present real-time actionable alerts, provide recommendations, and support decisions, wherein performing semantic reasoning on the dynamic knowledge base to discover patterns and anomalies among the social network interactions, events, or activities includes performing an Enhanced Heartbeat Graph (EHG)-based emerging event detection to predict an emerging event, wherein performing the EHG-based emerging event detection includes:

generating word metrics series, including temporal aggregation of text stream and network generation of aggregated super-document, generating EHG series, the EHG series being a set of graphs where each EHG is calculated from a pair of adjacent metrics in the word metrics series, identifying strong events by performing a rule-based classification function based on extracting three features of events, calculating ranking scores for words within a corresponding super-document of an EHG labeling strong to obtain a ranked list of keywords, and determining an emerging event by finding a representative micro-document in a time period that the EHG labels strong, the representative micro-document being a micro-document with the highest relevance score in the time period, and a relevance score of a micro-document being calculated as a sum of a ranking score of each word in that corresponding micro-document, and wherein performing semantic reasoning on the dynamic knowledge base to discover patterns and anomalies among the social network interactions, events, or activities includes performing a social network centrality analysis process, and the social network centrality analysis process includes building a logistic function to include all of a degree centrality, a betweenness centrality, and a closeness centrality into the function when assigning a network score for an item in a social network.

2. The system of claim 1, wherein the unstructured big data comprises text, images, videos, Uniform Resource Locators (URLs), geolocations, timestamps, or contextual data.

3. The system of claim 1, wherein the unstructured big data comprises dynamic knowledge and static knowledge, the dynamic knowledge including open source streaming data and open source historical data, and the static knowledge including ground truth knowledge data.

4. The system of claim 3, wherein the processor is configured to store the static knowledge in a knowledge graph (KG) database (KGDB) and to store the dynamic knowledge into knowledge nuggets with a standard resource description framework (RDF) format.

5. The system of claim 4, wherein the processor is configured to fuse the knowledge nuggets and KGDB to form the dynamic knowledge base.

6. The system of claim 1, wherein the instructions comprise an automatic anomaly detection module for detecting the anomalies and a pattern discovery module for discovering the patterns.

7. The system of claim 1, wherein the dynamic knowledge base includes a text data-based knowledge graph or a social knowledge graph.

8. The system of claim 1, wherein the processor is configured to perform one or more of a social network centrality analysis process, or a behavior pattern analysis process.

9. The method of claim 1, wherein the network score for the item $v_i$ is defined as:

$$p(v_i) = \frac{1}{1 + \exp(-(\beta_1 C_D(v_i) + \beta_2 C_C(v_i) + \beta_3 C_B(v_i)))}$$

where $\beta_j$, $j \in [1,2,3]$ is a parameter to standardize values of the degree centrality, the betweenness centrality, and the closeness centrality.

10. A computer-implemented method for anomaly and pattern detection of unstructured big data via semantic analysis and dynamic knowledge graph construction, performed by a hardware processor, comprising:

receiving unstructured big data associated with social network interactions, events, or activities;

parsing and structuring the unstructured big data to generate structured big data;

forming a dynamic knowledge base based on the structured big data;

performing semantic reasoning on the dynamic knowledge base to discover patterns and anomalies among the social network interactions, events, or activities; and feeding the anomalies and patterns into an interactive graphical user interface (GUI), to display real-time actionable alerts, provide recommendations, and support decisions, wherein performing semantic reasoning on the dynamic knowledge base to discover patterns and anomalies among the social network interactions, events, or activities includes performing an Enhanced Heartbeat Graph (EHG)-based emerging event detection to predict an emerging event, wherein performing the EHG-based emerging event detection includes:

generating word metrics series, including temporal aggregation of text stream and network generation of aggregated super-document, generating EHG series, the EHG series being a set of graphs where each EHG is calculated from a pair of adjacent metrics in the word metrics series, identifying strong events by performing a rule-based classification function based on extracting three features of events, calculating ranking scores for words within a corresponding super-document of an EHG labeling strong to obtain a ranked list of keywords, and determining an emerging event by finding a representative micro-document in a time period that the EHG labels strong, the representative micro-document being a micro-document with the highest relevance score in the time period, and a relevance score of a micro-document being calculated as a sum of a ranking score of each word in that corresponding micro-document, and wherein performing semantic reasoning on the dynamic knowledge base to discover patterns and anomalies among the social network interactions, events, or activities includes performing a social network centrality analysis process, and the social network centrality analysis process includes building a logistic function to include all of a degree centrality, a betweenness centrality, and a closeness centrality into the function when assigning a network score for an item in a social network.

11. The method of claim 10, wherein forming a dynamic knowledge base based on the structured big data, comprises:

performing triple extraction from text data of the structured big data;

constructing a text data-based knowledge graph (KG); and constructing a social knowledge graph (SKG).

12. The method of claim 11, wherein the triple extraction includes name entity recognition (NER) and predicate recognition.

13. The method of claim 10, wherein performing semantic reasoning on the dynamic knowledge base to discover patterns and anomalies among the social network interactions, events, or activities, comprises:

performing a behavior pattern analysis process, wherein the processes are configured to work in conjunction to enhance anomaly and pattern detection.

14. The method of claim 13, wherein the automatic fact-checking process includes information retrieval (IR), natural language process (NLP) techniques, or network/graph theory.

15. The method of claim 13, wherein the automatic fact-checking process comprises: knowledge inference.

16. The method of claim 15, wherein the knowledge inference includes a semantic proximity method.

17. The method of claim 13, wherein the emerging event detection process includes a feature pivot graph-based event detection method.

18. The method of claim 13, wherein the behavior pattern analysis process comprises an association rule method.

19. The method of claim 10, wherein the unstructured big data comprises text, images, videos, Uniform Resource Locators (URLs), geolocations, timestamps, or contextual data.

20. A non-transitory computer readable storage medium storing instructions that, when executed by one or more processors, cause the one or more processors to perform a method for anomaly and pattern detection of unstructured big data via semantic analysis and dynamic knowledge graph construction, the method comprising:

receiving unstructured big data associated with social network interactions, events, or activities;

parsing and structuring the unstructured big data to generate structured big data;

forming a dynamic knowledge base based on the structured big data;

performing semantic reasoning on the dynamic knowledge base to discover patterns and anomalies among the social network interactions, events, or activities; and feeding the anomalies and patterns into an interactive graphical user interface (GUI), to display real-time actionable alerts, provide recommendations, and support decisions, wherein performing semantic reasoning on the dynamic knowledge base to discover patterns and anomalies among the social network interactions, events, or activities includes performing an Enhanced Heartbeat Graph (EHG)-based emerging event detection to predict an emerging event, wherein performing the EHG-based emerging event detection includes:

generating word metrics series, including temporal aggregation of text stream and network generation of aggregated super-document, generating EHG series, the EHG series being a set of graphs where each EHG is calculated from a pair of adjacent metrics in the word metrics series, identifying strong events by performing a rule-based classification function based on extracting three features of events, calculating ranking scores for words within a corresponding super-document of an EHG labeling strong to obtain a ranked list of keywords, and determining an emerging event by finding a representative micro-document in a time period that the EHG labels strong, the representative micro-document being a micro-document with the highest relevance score in the time period, and a relevance score of a micro-document being calculated as a sum of a ranking score of each word in that corresponding micro-document, and wherein performing semantic reasoning on the dynamic knowledge base to discover patterns and anomalies among the social network interactions, events, or activities includes performing a social network centrality analysis process, and the social network centrality analysis process includes building a logistic function to include all of a degree centrality, a betweenness centrality, and a closeness centrality into the function when assigning a network score for an item in a social network.

* * * * *